H. UPDEGRAFF.
Breech-Loading Fire-Arms.

No. 155,348.

Patented Sept. 22, 1874.

5 Sheets--Sheet 1.

Witnesses.
J. L. Doubleday
Edmund Masson

Inventor.
Horace Updegraff
by H. H. Doubleday
atty.

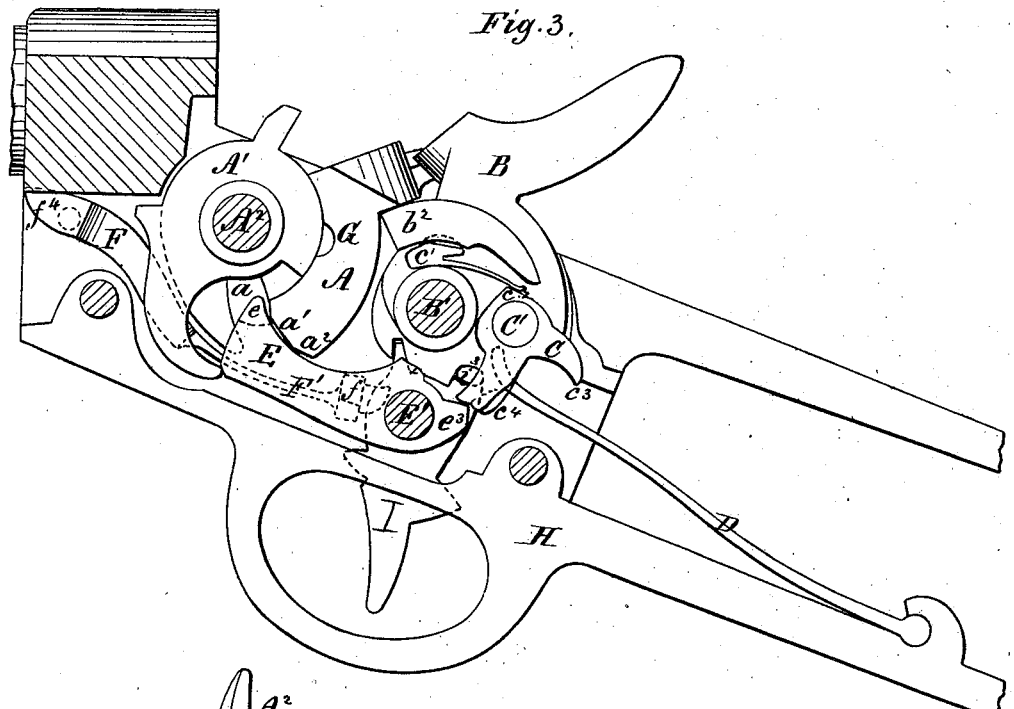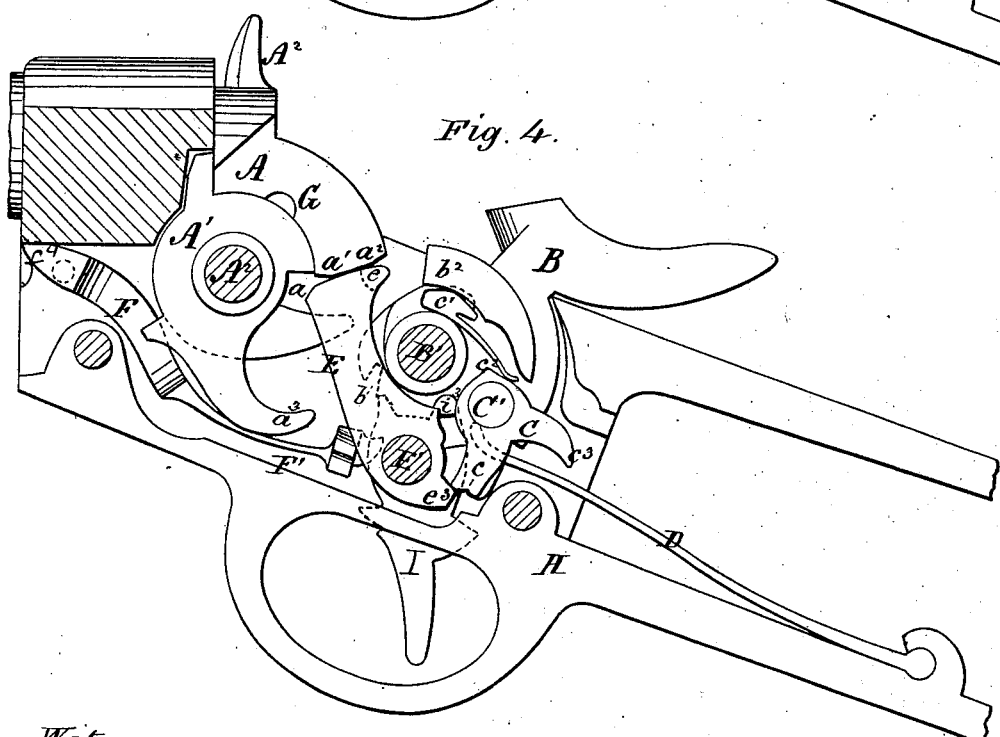

H. UPDEGRAFF.
Breech-Loading Fire-Arms.
No. 155,348.  Patented Sept. 22, 1874.
5 Sheets--Sheet 3.
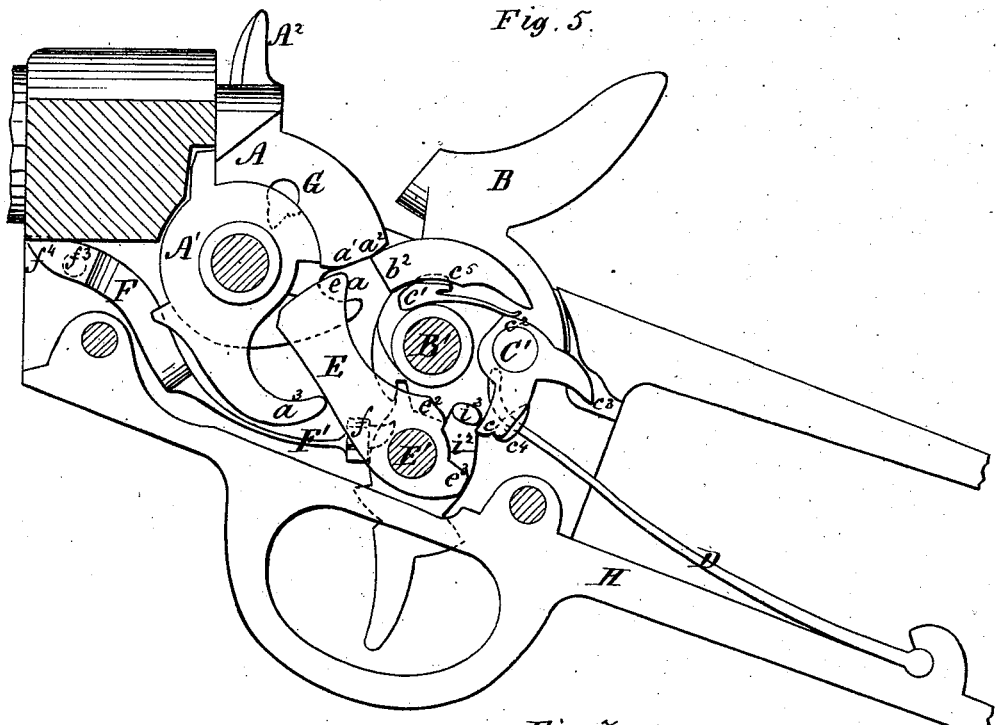
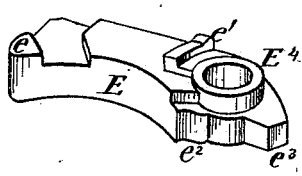
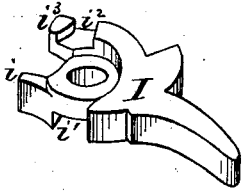
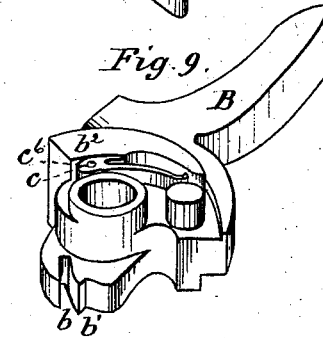
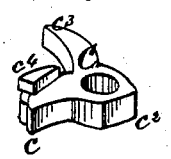
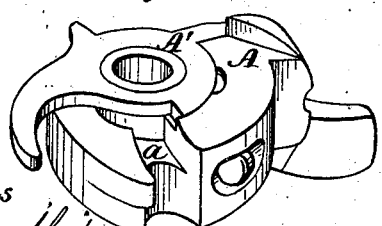
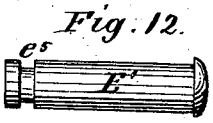
Witnesses
J. S. Doubleday
Edmund Masson
Inventor
Horace Updegraff
by H. H. Doubleday
atty.

5 Sheets--Sheet 4.

H. UPDEGRAFF.
Breech-Loading Fire-Arms.

No. 155,348. Patented Sept. 22, 1874.

Witnesses. Inventor.
Horace Updegraff
by H. H. Doubleday, atty

5 Sheets--Sheet 5.

H. UPDEGRAFF.
Breech-Loading Fire-Arms.

No. 155,348. Patented Sept. 22, 1874.

Witnesses
Geo. B. Coburn
Frosett Sloman

Inventor
Horace Updegraff
by H. H. Doubleday atty.

THE GRAPHIC CO. PHOTO-LITH. 39 & 41 PARK PLACE, N.Y.

UNITED STATES PATENT OFFICE.

HORACE UPDEGRAFF, OF SMITHFIELD, OHIO.

IMPROVEMENT IN BREECH-LOADING FIRE-ARMS.

Specification forming part of Letters Patent No. 155,348, dated September 22, 1874; application filed December 13, 1873.

*To all whom it may concern:*

Be it known that I, HORACE UPDEGRAFF, of Smithfield, in the county of Jefferson and State of Ohio, have invented certain new and useful Improvements in Breech-Loading Fire-Arms; and I do hereby declare the following to be a full, clear, and exact description of the invention, such as will enable others skilled in the art to which it pertains, to make and use it, reference being had to the accompanying drawings, which form part of this specification.

Figure 1:
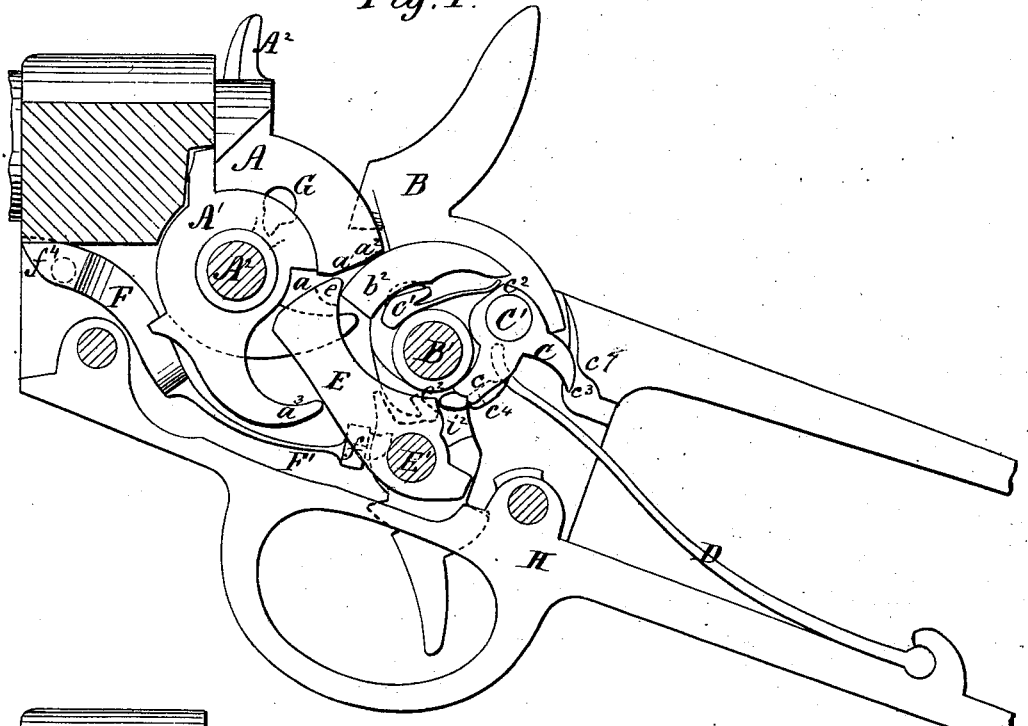
Figure 2:
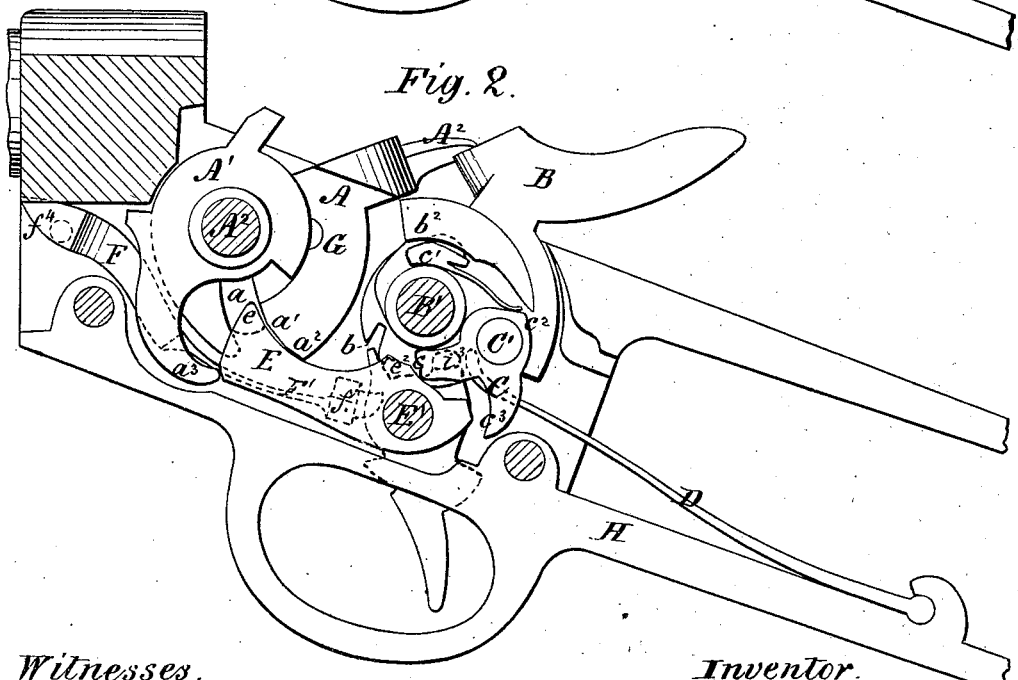

Figures 1, 2, 3, 4, and 5 are side views of the mechanism, with one side of the receiver removed, Fig. 1 representing the parts in the position which they occupy after the gun has been discharged. Fig. 2 shows their position after the cartridge has been ejected, the hammer having been drawn back a little past half-cock. Fig. 3 shows their position at half-cock. Fig. 4 represents them at full cock. Fig. 5 shows the piece at half-cock, with the breech-block closed. Figs. 6, 7, 8, 9, 10, 11, and 12 are detached views of the breech-block lever, the trigger, the trigger-spring, the hammer, the pawl, the breech-block, and the trigger-pivot.

A is the breech-block, and $A^1$ the ejector or extractor, the extractor being mounted upon a hub formed for its reception on the breech-block. The breech-block is provided upon one side with a radial groove, $a$, in which a lug or spur on the breech-block lever works to open and close said block, as will be explained. B is the hammer, having the usual half-cock and full-cock notches $b$ $b^1$, (see Fig. 9,) and a circular recess upon one side nearly concentric with the hub and pin $B'$. C is a pawl, mounted upon and vibrating about a pin, $C'$, made in one piece with or firmly secured to the hammer B, and located in the circular recess just referred to. $c$ is the arm of the pawl, which engages with and actuates the breech-block lever, to be hereinafter described. $c^1$ is a tongue-spring, its free end resting upon the pivoted end of pawl C to keep it, the pawl, in whatever position it may be placed. In order to insure that the spring shall do this the pawl has a projection, $c^2$, formed upon its pivoted end, the spring bearing alternately upon opposite sides of this point. The spring is secured in the recess of the hammer by means of a pivot, $c^6$, (see Fig. 9,) the upper wall of the recess being chambered so as to leave a lip, behind which a shoulder, $c^5$, (see Fig. 5,) of the spring is thrust when the pawl is in its place on pivot $C'$, as shown in dotted lines in Figs. 1, 2, 3, 4, and 5; but when the pawl is removed from its stud the shoulder $c^5$ will drop below the lip, when the spring can be removed. The leg $c$ of the pawl has an inwardly-projecting flange, $c^4$, shown in full lines in Fig. 10 and indicated in dotted lines in Figs. 1, 2, 3, 4, and 5. $c^3$ is another leg of the pawl C. D is the hammer-spring, which may be of any usual or approved construction. E is the breech-block lever. Fig. 6 is a reverse view of this lever, showing clearly its peculiar construction. It has a lug or horn, $e$, which rests in the slot $a$ in the breech-block, and it will be readily seen from an examination of the drawings that when this lever vibrates about its pivot $E'$, the lug $e$ will cause the breech-block to oscillate about its pivot $A^2$. Lever E is also provided upon its inner face with a spur, $e^1$, which, in connection with a trigger-spring of a novel construction, serves as a check, in a manner and for a purpose which will soon be set forth. The rear or heel end of lever E has two shoulders, against either of which the pawl C presses alternately. F F' is the trigger-spring, the thin elastic portions, as indicated by these letters, occupying planes at right angles to each other. This spring is held in place as follows: A pivot, $f^3$, (see Figs. 5 and 8,) enters the wall of the receiver; the heel-extension $f^4$ enters a recess cut for its reception in the lower side of the gun-barrel or in the upper side of the receiver, where it is held firmly when the rear or free end of the spring engages with the trigger, (see dotted lines in Figs. 1, 2, 3, 4, and 5,) and when in this position that part of this spring which is marked F' yields readily to permit the vertical movement of its rear end, marked $f^1$, which engages with the trigger to press the dog or lip of the trigger into the half-cock and full-cock notches of the hammer, and also to shift the arm $c$ of the pawl C, in order that it may properly actuate the breech-block lever E, as will be hereinafter explained. That portion of the trigger-spring which is marked F will yield to allow a lateral movement of the free or rear end $f^1$, which is provided with a block or check-piece, $f$, having a central notch, $f^2$, and beveled ends, as plainly shown in Fig. 8. This spring is arranged with its free end behind lever E, as seen from the side of the gun which is presented to view in the drawings, the lever being placed in a position the reverse of that shown in Fig. 6, so that the side which is seen in that figure is turned inward toward the trigger-spring, the relation of these devices being such that the spur $e^1$ rests in the notch $f^2$ when the parts are in the position shown in Figs. 1 and 12, and as the spring presses the block $f^1$ against the spur $e^1$ with considerable force, it will be apparent that pressure enough must be applied to lever E before the spur will be moved out of the notch $f^2$ to insure that, when the parts do yield, the breech-block shall be thrown open with a snap.

Thus it will be seen that the trigger-spring acts as a friction-stop to restrain the movement of lever E, and it is also evident that this end will be attained in a measure without the use of the notched block $f^1$ or the spur $e^1$.

G is the rock-shaft, which serves to withdraw the spring-pin behind the face of the breech-block when it (the block) is opened. H is the trigger-guard, and I is the trigger. The pivot $E^1$, on which the trigger and breech-block lever are mounted, has a groove, $e^5$, at a distance from one end equal to the thickness of the wall of the receiver, and an arm or pin, projecting from the trigger-guard, enters this groove $e^5$ when the parts are in working position, thus locking pin $E^1$ in place. The trigger I has the usual locking-dog $i$, and a notch, $i^1$, to receive the end $j^1$ of the trigger-spring F F'. It (the trigger) is further provided with an upwardly-extending arm rising from behind the pivot $E^1$. This arm is notched, as at $i^2$, Figs. 1, 5, and 7, leaving a spur, $i^3$, at the upper end. The trigger is mounted upon pivot $E^1$ inside of the lever E, and is chambered to receive the hub $E^4$ of said lever; hence, these two pieces in a measure overlap each other, so that the pawl C occupies the same vertical plane as the shoulders $e^2$ $e^3$ of the lever—thus, when the parts are making one movement, which I will presently describe, the flange $c^4$ passes through the notch $i^2$ in the arm of the trigger.

In Fig. 1 the parts are represented in the position which they occupy after the gun has been discharged. If I wish to eject the cartridge I draw the hammer backward.

When the shoulder $b^2$, which should be formed in an arc of a circle, of which the hammer-pivot $B^1$ is the center, has escaped from the shoulder $a^2$ of the breech-block, the pawl C will have advanced and engaged with the shoulder $e^2$ of the breech-block lever E, moving the front end of said lever downward until the lug $e$ strikes the breech-block at the lower side of the slot $a$, and also bringing the central part of the lower side of the lever in contact with the heel-end $a^3$ of the cartridge-retractor $A^1$. (See Fig. 1.) A further backward movement of the hammer into the position shown in Fig. 2 will eject the cartridge by the positive mechanical movement of the hammer B, pawl C, lever E, and retractor $A^1$, as will be readily seen from an inspection of Figs. 1 and 2.

The construction and relative arrangement of the stop or check piece $f$ on the trigger-spring, and the spur $e^1$ on lever E, are such that, when the retractor $A^1$ has been moved far enough to loosen the cartridge-shell from its place in the barrel, the spur $e^1$ rests in the notch $f^2$ in check-piece $f$, and is held there until enough pressure has been applied to the lever, through the hammer and pawl, to overcome the friction of the spring and check, when the parts will move into the position shown in Fig. 2, thereby throwing out the shell with a snap, while the movement of the retractor is a positive one, the pawl, the lever E, and the retractor being in close contact with each other at the end of this movement, as seen in Fig. 2.

It will also be observed that the breech-block now rests against the shoulder $b^2$ of the hammer, and the forward end of lever E cannot be depressed any further; therefore the hammer cannot be drawn back to full cock.

It will also be seen that, as the pawl C moved from its position in Fig. 1 to that which it occupies in Fig. 2, the flange $c^4$ passed through the notch $i^2$ in the upright arm of the trigger to a position immediately behind the spur $i^3$. I now release the hammer, when the mainspring D moves it (the hammer) forward until the dog of the trigger enters the half-cock notch, the spur $i^3$ striking the flange $c^4$, and throwing the pawl backward so that it rests immediately above the shoulder $e^3$ on the heel end of lever E, the spring $c^1$ retaining the pawl in its new position, the relative arrangement of parts being shown in Fig. 3.

A new cartridge may now be introduced, and the hammer drawn back to full cock, as in Fig. 4, and as the hammer is thus drawn back to full cock the pawl C presses down the heel end of lever E, closes the breech-block, and effectually locks it.

As the shoulder $a^1$ of the breech-block forms an arc of a circle, of which the lever-pivot $E^1$ is the center, and the opposing end of the lever forms an arc of the same circle, it will be readily seen that, while the piece is at full cock, the breech-block cannot be forced open without first breaking some of the pieces. In this position the trigger-spring presses upward against lever E, and holds it firmly in place, locking the breech-block until the shoulder $b^2$ of the hammer drives the lever down, when the gun is fired.

As the hammer goes forward to drive in the firing-pin the arm $c^3$ of the pawl strikes a suitable projection, as at $c^7$, thus returning the leg $c$ to its former place against the hub of the hammer, so that as said hammer is drawn backward the pawl will again engage with the inner shoulder, as at $e^2$, of the lever, and thus open the breech-block and eject the cartridge, as has been above described.

It is sometimes found desirable to load the piece leaving the hammer at half-cock. This can be done by pressing against the thumb-piece of the breech-block with sufficient force to overcome the restraint of the check-piece $f$, the position of parts, when the breech-block is closed, being shown in Fig. 5; and by an examination of this figure it will be seen that, although the front end of lever E has not been raised high enough to lock the breech-block, yet the block is effectually locked by the shoulder $b^2$ of the hammer, the dog of the trigger having entered to the full depth of the half-cock notch.

Figure 18:
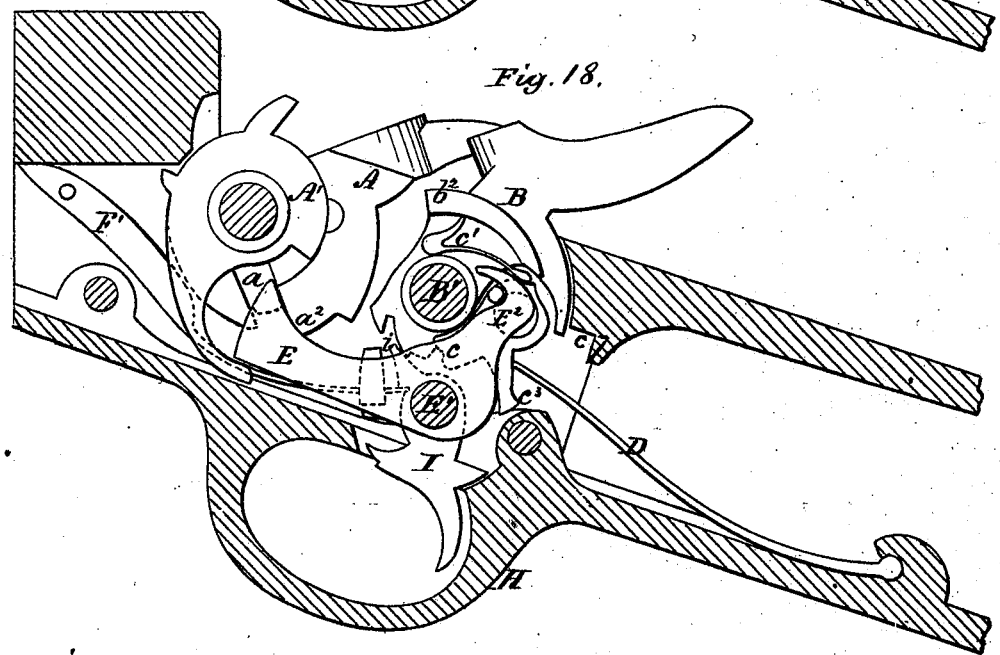

In Figs. 12, 13, 14, 15, 16, 17, and 18 I have represented the breech-block lever E as having its heel end extended upward, and formed into a hook, $E^2$, which, when the hammer is drawn backward to eject the cartridge, as in Fig. 18, is made to clasp over and in position to engage with a pin, $c^8$, projecting from the hub or ring of the pawl. This pin is plainly shown in Fig. 16.

Figure 12:
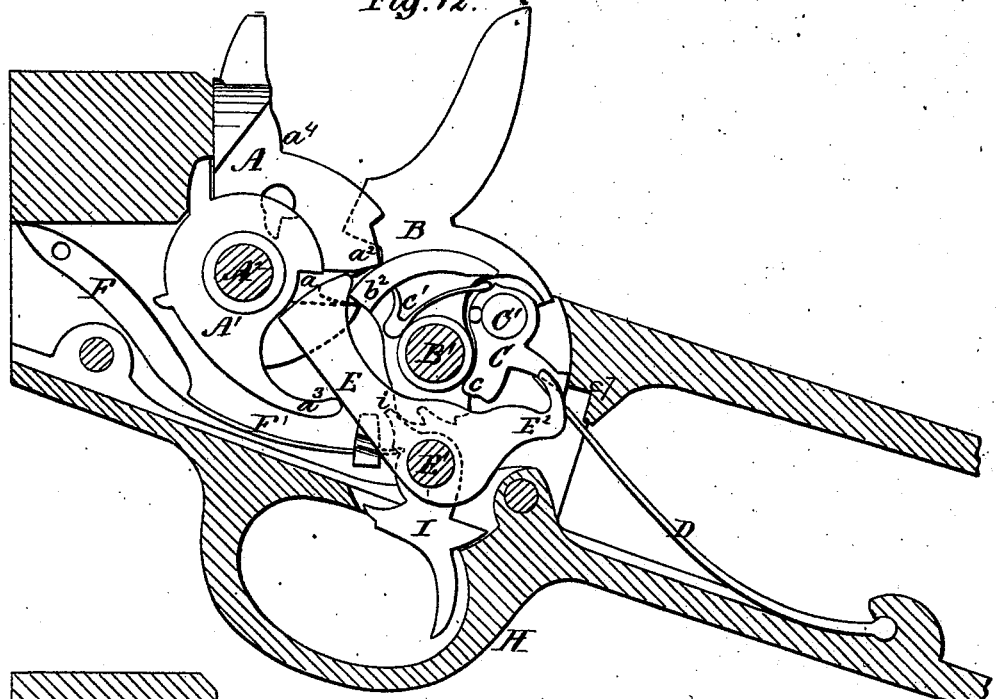
Figure 13:
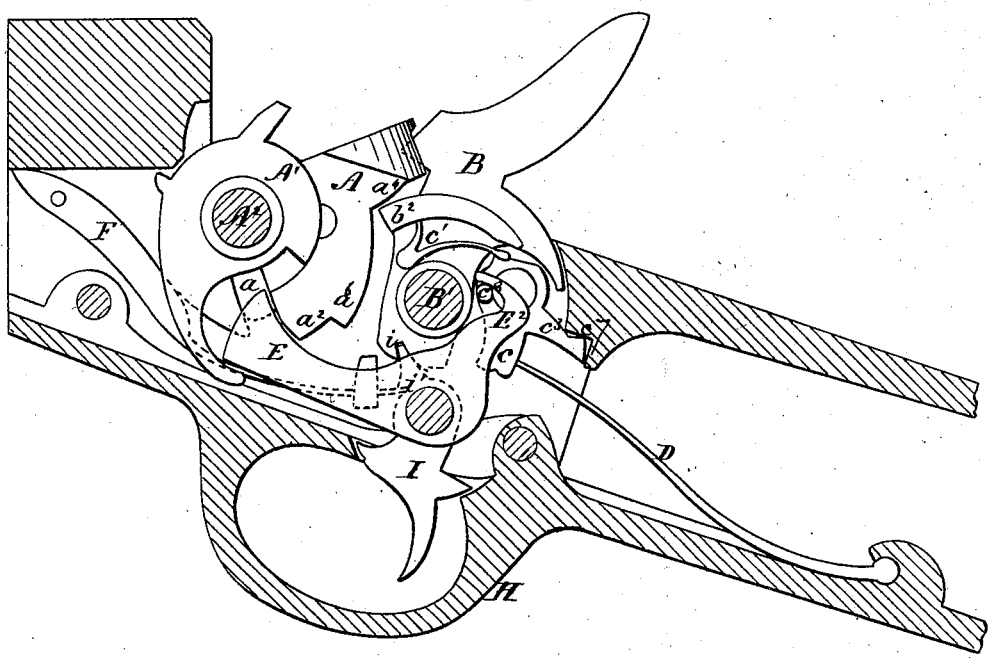
Figure 14:
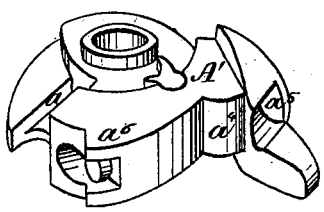
Figure 15:
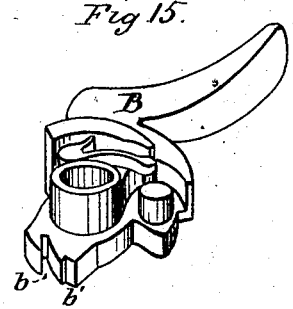
Figure 16:
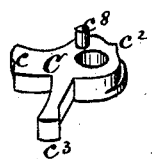
Figure 17:
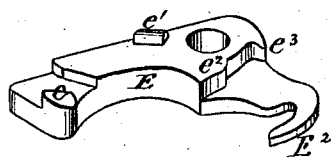

By an inspection of Figs. 12, 18, and 13, in the order in which I have named them, it will readily be seen that when the hammer moves forward to rest at half-cock, as has been already described, the hook $E^2$ and pin $c^8$ will throw the leg $c$ of the pawl backward over the shoulder $e^3$ of lever E, substantially as would be accomplished by the arm $i^3$ and flange $c^4$ during a similar movement of the hammer under the construction shown in Sheets 1, 2, and 3.

In Figs. 12, 13, 16, and 18 the leg $c^3$ of the pawl is of such length and the shoulder or stop $c^7$ is arranged in such position that the leg $c$ of the pawl is returned to its position in close contact with the hub of the hammer some time before the nose of the hammer strikes the firing-pin, and as the hammer continues its forward stroke the end of leg $c^3$ moves up in front of the stop $c^7$. Thus, by letting the hammer down carefully until it is within a short distance of the firing-pin, and then drawing it backward, the piece may be unloaded without being first discharged.

In Figs. 12, 13, 14, and 18 the rear portion of the breech-block is made in the form of a cam, having its widest part at the rear, and terminating in a shoulder, as shown at $a^6$. The object of this construction is as follows: In case the trigger be pressed backward when the hammer is moving from the position shown in Fig. 18 to that shown in Fig. 13, it (the trigger) will not enter the half-cock notch. If, now, the breech-block be closed by hand, the cam $a^6$ will force the hammer backward far enough to insure that the trigger can enter the half-cock notch, thus effectually preventing a premature discharge.

$a^5$ represents a recess cut in the breech-block, in which the nose of the hammer rests when the parts are in the position shown in Fig. 13, and thus tends to prevent any forward movement of the breech-block, in order that when a cartridge is inserted said block shall not be moved thereby, because, if the block were to be partially closed, it would sometimes fall back by its own weight, and throw out a cartridge which fitted loosely.

When the piece is discharged the shoulder $b^2$ strikes the wedge-shaped portion $a^4$ of the breech-block, and rocks it forward, lifting up the front end of lever E, permitting the retractor to approach the barrel, thus allowing the cartridge to enter far enough to avoid cramping when the breech-block is brought to force it entirely in.

Having thus described my invention, what I claim is—

1. As a means for opening and closing the breech-block, the combination of the lever E and vibrating pawl C with the hammer B, substantially as set forth.

2. The combination of the spring F F', provided with the check $f$, with the lever E, substantially as described.

3. As a means for closing the breech-block, and for locking it against the end of the barrel when the hammer is at full cock, the lever E, operating substantially as set forth.

4. The combination, with the trigger and the lever E, of the trigger-spring, having its parts F F' constructed to vibrate in different planes, substantially as set forth.

5. The breech-block, provided with the incline or cam $a^6$, for forcing the hammer backward when the breech-block is being closed by hand, substantially as described.

6. The breech-block, provided with the wedge-shaped shoulder $a^4$, whereby the block is moved forward by the hammer when said hammer moves forward to half-cock, substantially as set forth.

7. The lever E, provided with the hook $E^2$, in combination with the vibrating pawl C, substantially as set forth.

8. The arrangement of the arm $c^3$, relative to the stop $c^7$, whereby the said arm is permitted to escape from said stop before the hammer strikes the firing-pin, whereby the gun may be unloaded without firing, substantially as set forth.

In testimony that I claim the foregoing I have hereunto set my hand this 18th day of October, 1873.

HORACE UPDEGRAFF.

Witnesses:
CHARLES KING,
J. W. HAMILTON JOHNSON.